US012699245B2

(12) United States Patent
Beck et al.

(10) Patent No.: US 12,699,245 B2
(45) Date of Patent: Aug. 4, 2026

(54) HOMOGENEOUS SUPPORT FOR LARGE OPTICAL ELEMENTS

(71) Applicant: TRUMPF Laser-und Systemtechnik GmbH, Ditzingen (DE)

(72) Inventors: Torsten Beck, Stuttgart (DE); Silke Thierfelder, Ditzingen (DE); Michael Fischer, Stuttgart (DE); Andreas Heimes, Althengstett (DE); Thomas Zeller, Sindelfingen (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 191 days.

(21) Appl. No.: 18/822,493

(22) Filed: Sep. 3, 2024

(65) Prior Publication Data

US 2024/0427109 A1     Dec. 26, 2024

Related U.S. Application Data

(63) Continuation of application No. PCT/EP2023/054066, filed on Feb. 17, 2023.

(30) Foreign Application Priority Data

Mar. 4, 2022    (DE) ..................... 10 2022 105 109.9

(51) Int. Cl.
G02B 7/02          (2021.01)

(52) U.S. Cl.
CPC ...................................... G02B 7/02 (2013.01)

(58) Field of Classification Search
CPC ....... G02B 7/02; G02B 7/183; G02B 7/00–40
See application file for complete search history.

(56) References Cited

U.S. PATENT DOCUMENTS 6,043,863 A * 3/2000 Ikeda ..................... G02B 17/08
355/71
2003/0234916 A1* 12/2003 Watson .................. G02B 7/026
355/53
(Continued)

FOREIGN PATENT DOCUMENTS

CN          113917645 A      1/2022
DE     102005026958 A1    12/2006
(Continued)

OTHER PUBLICATIONS

Pinto Artur C et al: "Surface metrology of cylindrical mirrors with sagittal curvature in low spatial frequency range", SPIE Proceedings; [Proceedings of SPIE ISSN 0277-786X], SPIE, US, vol. 11492, Aug. 21, 2020, pp. 1149209-1149209, XP060133523, DOI: 10.1117/12.2568868 ISBN: 978-1-5106-3673-6.

*Primary Examiner* — Bao-Luan Q Le
(74) *Attorney, Agent, or Firm* — LEYDIG, VOIT & MAYER, LTD.

(57) ABSTRACT

A device mounts a large-scale optical unit, and includes a carrier plate; a rigid support surface, which is arranged on the carrier plate and is designed for mounting a bottom surface of the large-scale optical unit in a predetermined position and a predetermined orientation; and an elastic support surface, which is arranged on the carrier plate and is designed for mounting the bottom surface of the large-scale optical unit elastically. The rigid support surface is designed for mounting the large-scale optical unit at a Bessel point of the large-scale optical unit.

10 Claims, 6 Drawing Sheets

(56)        References Cited

U.S. PATENT DOCUMENTS

2004/0257679 A1* 12/2004 Sudoh .................... G02B 7/183
                                                        359/811
2018/0120712 A1*  5/2018 Peng ..................... F16M 13/02

FOREIGN PATENT DOCUMENTS

| DE | 102007002772 | A1 |   | 10/2007 |        |            |
|----|--------------|----|---|---------|--------|------------|
| DE | 102017220306 | A1 | * | 9/2018  | ........ | G03F 7/70825 |
| JP | 2000028898   | A  | * | 1/2000  | ........ | G03F 7/70825 |
| JP | 2006350065   | A  |   | 12/2006 |        |            |
| JP | 2014085194   | A  | * | 5/2014  |        |            |
| JP | 6051361      | B2 |   | 12/2016 |        |            |
| JP | 2017097023   | A  | * | 6/2017  |        |            |

* cited by examiner

HOMOGENEOUS SUPPORT FOR LARGE OPTICAL ELEMENTS

CROSS REFERENCE TO RELATED APPLICATIONS

This application is a continuation of International Application No. PCT/EP2023/054066 (WO 2023/165822 A1), filed on Feb. 17, 2023, and claims benefit to German Patent Application No. DE 10 2022 105 109.9, filed on Mar. 4, 2022. The aforementioned applications are hereby incorporated by reference herein.

FIELD

The present disclosure relates to a device for mounting a large-scale optical unit.

BACKGROUND

Large-scale optical units, i.e. optical components with diagonals of more than 200 mm (preferably more than 500 mm), such as large lenses, are part of many laser systems. Among other things, large-scale optical units are used in the production of OLED (organic light-emitting diode) displays for smartphones, tablet PCs, television sets, etc.

Linear laser illumination is used here to thermally process a workpiece. A further widely used application for the sequential illumination of a workpiece with a defined laser line can be the line-by-line melting of amorphous silicon on a carrier plate. Similar to the production of OLED displays, the laser line is moved at a defined speed relative to a workpiece surface. By melting and subsequent cooling, the comparatively low-cost amorphous silicon can be converted into higher-quality polycrystalline silicon. Such an application is often referred to in practice as solid state laser annealing (SLA), sequential lateral solidification (SLS), or excimer laser annealing (ELA).

Large-scale optical units are often used in particular for generating long, defined laser lines. In order to obtain precise laser lines, the precision of the optical unit in the laser systems plays a decisive role. This refers both to the quality of the optical unit itself, but also to its position and orientation in space. For example, the smallest changes in the position and orientation of a lens having a high refractive index can have a major effect on the quality of a laser line in the working plane. Likewise, for example, an incorrect position or orientation of a deflection mirror can have a major effect on the beam path of a laser and thus the shape of the laser lines on the working plane. In this respect, the mounting of optical components, especially large-scale optical units, often presents a major challenge.

One way to mount optical units is to use a device in which the optical unit is mounted or held by its edges. However, this type of mounting results in maximum deflection in the center of the optical units. While this effect does not play a major role in small optical units, there is a risk of very pronounced deflection if large-scale optical units, which can weigh 40 kg or more, are mounted in this way. This is the case especially with elongate large-scale optical units.

In order to minimize deflection, it is customary for large, elongate optical units to be mounted in the Bessel points, as they are known. By definition, the Bessel points are the two symmetrically arranged mounting points of a longitudinal member, in which the latter experiences the lowest possible gravity-induced deformation. In other words, Bessel points are the support points of a longitudinal member (or in this case of a large-scale optical unit), in which the tangent to the optical unit runs horizontally in the support point.

However, the problem with mounting large-scale optical units in the Bessel points is that local stresses arise in these points or in the regions of these points of the optical unit. The result of these stresses is optical anisotropy of the optics material. This means that an optical wave train is split into two parts with different planes of vibration when it penetrates the optics material. The propagation speed of light and, consequently, the refractive index then depend on the direction. This phenomenon is called stress birefringence. In particular, it causes the polarization of an incident laser beam to change, as described above. Polarization-sensitive methods such as the abovementioned solid state laser annealing (SLA) can then no longer be carried out precisely.

Even if a laser processing process is inherently polarization-insensitive, but a subsequent measurement system is polarization-sensitive, a change in the polarization of a laser beam caused by a large-scale optical unit can have negative effects. This is because under certain circumstances the measurement result of a polarization-sensitive camera can indicate a faulty optical unit if the measurement results are misinterpreted, even though the optical unit itself functions perfectly.

SUMMARY

In an embodiment, the present disclosure provides a device that mounts a large-scale optical unit, and includes a carrier plate; a rigid support surface, which is arranged on the carrier plate and is designed for mounting a bottom surface of the large-scale optical unit in a predetermined position and a predetermined orientation; and an elastic support surface, which is arranged on the carrier plate and is designed for mounting the bottom surface of the large-scale optical unit elastically. The rigid support surface is designed for mounting the large-scale optical unit at a Bessel point of the large-scale optical unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
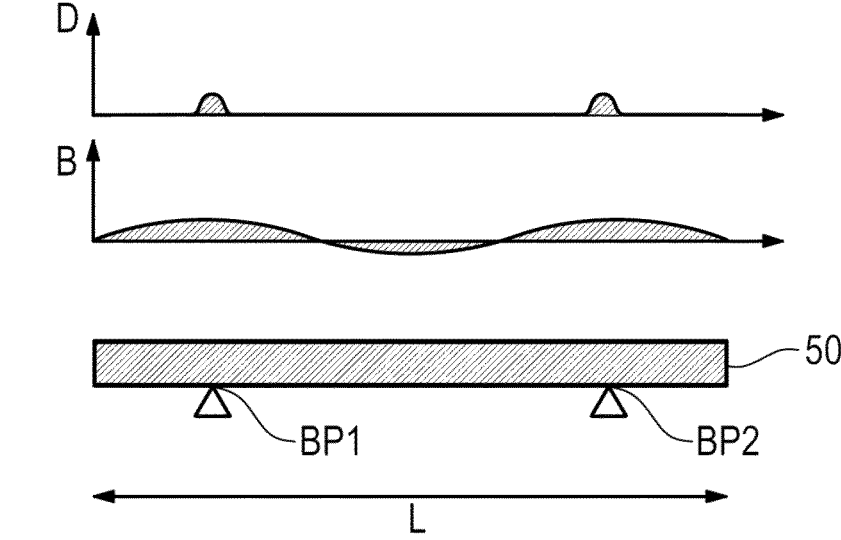
FIG. 1A shows a simplified schematic illustration of a mounting of a large-scale optical unit in its Bessel points and the associated compressive stress profile and bending stress profile.

Aspects of the present disclosure provide a device with which (in particular elongate) large-scale optical units can be supported as far as possible without deflection and stress. Primarily, local stresses within the large-scale optical unit should be avoided.

An exemplary embodiment of the present disclosure provides a device for mounting a large-scale optical unit according to one aspect of the present disclosure, which, in addition to a rigid support surface, which is arranged on a carrier plate and designed for mounting a bottom surface of the large-scale optical unit in a predetermined position and orientation, further, has an elastic support surface, which is arranged on the carrier plate of the device and is designed for mounting the bottom surface of the large-scale optical unit elastically. The new device has a first support surface ("rigid support surface") and a second support surface ("elastic support surface"), wherein the first support surface is (substantially) less elastic than the second support surface. This means that the terms "rigid" and "elastic" must be interpreted such that "rigid" means "less elastic" compared to "elastic" and that "elastic" means "less rigid" compared to "rigid." Elastic mounting by way of the elastic or second support surface can also be understood as "floating" mounting.

The new device of the present disclosure allows the weight of the optical unit to be distributed over a large area with a small residual force. Contrary to the state of the art, the rigid mounting is not (substantially) point-type or line-type, but a surface-type and therefore more uniform mounting. In fact, the elastic support surface is designed to cling to the surface of the large-scale optical unit and thus to (better) support the large-scale optical unit. As a result, the local force acting on the large-scale optical unit decreases starting from the rigid support surface in such a way that polarization effects resulting from local stresses are significantly reduced.

Usually, the rigid support surface consists of a narrow, rigid bar, which extends along a short axis of the bottom surface (bottom surface) of the large-scale optical unit. The material for the rigid support surface must be chosen in such a way that the rigid support surface does not yield, or yields only slightly, under the influence of the weight force of the large-scale optical unit mounted thereon. In other words, a rigid material that is able to bear the optical unit over time and does not yield should be chosen. For example, a hard metal such as steel can be chosen as the material for the rigid support surface. As a rule, the large-scale optical unit is mounted in such a way that its bottom surface, i.e. its base surface, runs parallel to the carrier plate. The carrier plate is usually arranged horizontally.

In addition to a rigid support surface, it is also possible to use a plurality of, in particular two, mutually separate rigid support surfaces. In fact, two rigid support surfaces are used in many mounting devices, as the large-scale optical unit is easily adjusted or aligned in this way. In particular, with two rigid support surfaces and a defined contact of the large-scale optical unit against these two support surfaces, a rotation or tilt of the large-scale optical unit can be avoided.

In order to mount the large-scale optical unit in a set position and orientation, one or more (rigid) support surfaces which are designed for mounting a side surface of the large-scale optical unit in a predetermined position and/or orientation. may furthermore be provided.

The term "rigid" with respect to the rigid support surface (or the rigid contact surface) does not mean that the support surface (or contact surface) cannot be adjustable. However, it must be possible for an adjustable support surface or contact surface to be locked in place so that the large-scale optical unit can be fixedly mounted.

Preferably, the rigid support surface has a modulus of elasticity of at least $20 \, \text{kN/mm}^2$ and/or at most $500 \, \text{kN/mm}^2$, in particular at least $40 \, \text{kN/mm}^2$ and/or at most $250 \, \text{kN/mm}^2$. For example, the rigid support surface has, based on a surface area of the contact surface with the large-scale optical unit of $5,000 \, \text{mm}^2$, a spring constant of at least 10 MN/mm and/or at most 1000 MN/mm, preferably at least 100 MN/mm and/or at most 500 MN/mm.

The term "elastic" with respect to the elastic support surface is to be understood to mean that the elastic support surface yields under a load with a weight, in particular the weight of the large-scale optical unit, to be precise, preferably yields to a defined extent. For example, the elastic support surface may have a predetermined preload, which allows the support surface to yield in a defined manner under the load of the weight of a large-scale optical unit. The yielding of the elastic support surface under the influence of the weight of the large-scale optical unit means that it can be mounted in a floating manner.

In principle, the use of a plurality of elastic support surfaces is also conceivable. Preferably, these are uniformly distributed so that they can uniformly support the base surface of the large-scale optical unit. Depending on the shape of the large-scale optical unit, it is advantageous that a plurality of elastic support surfaces are arranged in one (or more) row(s) transversely and/or parallel to a long side (or longitudinal axis) of the carrier plate or the large-scale optical unit. An arrangement of a plurality of rows of elastic support surfaces in a direction parallel to the longitudinal direction of the carrier plate is particularly advantageous if the large-scale optical unit has a thickness (in the transverse direction) of several centimeters. For example, the plurality of elastic support surfaces may be spring pressure pieces.

The carrier plate of the device may be formed as a separate plate, which is designed to be inserted into a socket for a large-scale optical unit. Nevertheless, the carrier plate may be a constituent part of such a socket.

In a preferred refinement, the rigid support surface of the device is designed for mounting the large-scale optical unit at a Bessel point of the large-scale optical unit or at an edge point of the bottom surface of the large-scale optical unit.

A Bessel point of the large-scale optical unit is defined as one of the two symmetrical points at which the large-scale optical unit would experience minimal deformation if it were mounted on these points. Edge points are the points at the ends of the longitudinal axis of the large-scale optical unit. These are usually points whose imaginary connecting line is perpendicular to the direction of incidence of a laser beam in laser systems.

In a further embodiment, a metal film and/or a plastics film is arranged on the rigid support surface. The use of such a film can be helpful in particular if the device comprises a plurality of rigid support surfaces and these are aligned not exactly parallel or have different heights compared to the carrier plate. Even slight differences in height are sufficient for undesirable stress peaks to occur in the large-scale optical unit mounted thereon. In order to avoid such stress peaks, a metal and/or plastics film can be laid out on at least one of the rigid support surfaces, to be precise toward the bottom side of the large-scale optical unit, so that the film(s) run(s) parallel to the bottom side of the large-scale optical unit. The metal film used is preferably tin or aluminum film. Alternatively or additionally, the use of a plastics film, e.g. a polytetrafluoroethylene (PTFE) film, is conceivable. It is also conceivable to use a plurality of stacked metal or plastics films, for example a tin film and an aluminum film, which can be arranged in any manner on top of one another. With the aid of such films, any differences in height can be easily compensated.

In a further refinement, more than 50 percent of the weight force of the large-scale optical unit acts on the elastic support surface, preferably between 70 and 95 percent of the weight force, with further preference between 85 and 95 percent of the weight force.

Accordingly, less than 50 percent of the weight force of the large-scale optical unit acts on the rigid support surface (or the rigid support surfaces), preferably between 5 and 30 percent of the weight force, with further preference between 5 and 15 percent of the weight force.

Firstly, this refinement ensures that the stresses induced by the rigid support surface locally in the optical unit are reduced as far as possible. Secondly, it is ensured that sufficient weight force is still carried by the rigid support surface to ensure precise positioning and alignment of the large-scale optical unit or to ensure a safe and defined contact at contact points of the device. Particularly preferably, 90 percent of the weight force of the large-scale optical unit is mounted on the elastic support surface and 10 percent of the weight force is mounted on the rigid support surface (or the rigid support surfaces).

In a further refinement of the device, the elastic support surface comprises a spring strip with a multiplicity of elastic springs.

The spring strip is formed from a series of springs in a line, wherein the springs are connected to one another at least in one place. The arrangement of the spring strip in the device is preferably chosen here such that the longitudinal direction (i.e. the direction along the longer side) of the spring strip runs parallel to the longitudinal axis of the carrier plate (or, when installed, to the longitudinal axis of the large-scale optical unit). The shape of the springs is basically arbitrary. Particularly suitable are springs which have a curvature away from the carrier plate and thus point to the bottom surface of a large-scale optical unit to be mounted. Equally suitable are springs which have an elastic (or resilient) arm pointing away from the carrier plate, preferably at an angle of between 30° and 50° away from (the surface of) the carrier plate.

In a further refinement, a gradient of a spring characteristic curve of a spring of the elastic springs of the spring strip is between 0.1 N/mm and 10 N/mm, preferably between 0.5 N/mm and 2 N/mm, with further preference between 0.8 N/mm and 1.2 N/mm, i.e., for example, 1 N/mm. The spring constant of the entire spring strip depends on the number of individual springs and the length of the strip. The spring characteristic curve of a spring indicates how a spring behaves when working. More specifically, it describes the relationship between spring force and travel. Depending on the design of the spring or the spring system used, a distinction is made between a linear, progressive, degressive or combined spring characteristic curve. In principle, springs with a low gradient in their spring characteristic curve (little change in force when changing path) are better suited than springs with a large gradient in their spring characteristic curve. In this respect, very elastic springs should be preferred in particular, since possible tolerances can be better compensated or a more even weight distribution is ensured hereby.

In particular, provision may be made for the spring strip to have at least 50 and/or at most 400 elastic springs, preferably at least 100 and/or at most 300 elastic springs, and particularly preferably at least 150 and/or at most 250 elastic springs.

For example, the spring strip has a length of between 50 mm and 1000 mm and preferably between 100 mm and 600 mm.

In a preferred refinement of the device, the material of the spring strip comprises metal and/or plastic.

Possible metals include copper or copper alloys such as copper beryllium (CuBe), bronze (CuSn) or brass (CuZu), stainless steel, stainless steel alloys or aluminum alloys. Copper beryllium in particular is suitable as a material for the spring strips, because despite its high strength it is easily deformable, has a high relaxation resistance and is durable (in particular stainless).

Possible plastics for the spring strip are, for example, elastomers, carbon-fiber-reinforced plastics (CFRP) or glass-fiber-reinforced plastics (GFRP), in particular carbon-fiber-reinforced or glass-fiber-reinforced elastomers. Polyetherimides (e.g. 1.4-bis(4-nitrophthalimide) phenyls) are also particularly suitable. Spring strips made of suitable plastics offer high strength, good fatigue behavior, hardly any corrosion problems and low weight.

However, since resistance to UV irradiation is limited in some plastics and outgassing can sometimes also occur, which can interfere with sensitive optical processes, metal spring strips are typically preferred.

Depending on the size or thickness of the large-scale optical unit, it may also be advantageous if a plurality of springs are arranged in a row on the carrier plate in such a way that the row runs parallel to or transversely to the longitudinal axis of the large-scale optical unit when the large-scale optical unit is fixed on the carrier plate.

With further preference, the spring strip has a predetermined metal thickness and/or preload.

In a further refinement, the elastic support surface comprises a plurality of threaded screws, preferably threaded screws which comprise an elastic spring.

The number of threaded screws used is arbitrary. In principle, the more threaded screws are used, the more weight of the large-scale optical unit can be transferred to the threaded screws and the stronger is the relief for the rigid support surface(s). The threaded screws are distributed on the carrier plate as far as possible in such a way that they can support the large-scale optical unit evenly.

Preferably, the threaded screws are screws that comprise a spring or screws with a resilient pressure piece. The resilient pressure piece may be embedded in the core of the screw. Nevertheless, screws are also conceivable in which a spring is arranged around the outside of the thread.

In a further refinement, the elastic support surface comprises a plurality of elastic plastics bearings, preferably elastomer bearings.

The plastics bearings can, for example, be in the form of O-rings.

In a further refinement of the device, the elastic support surface comprises at least one of a hydrostatic bearing, a hydrodynamic bearing, an aerostatic bearing and an aerodynamic bearing.

The elastic support surface may comprise a gas pressure spring. Because gas pressure springs usually contain nitrogen as a gas, they are also particularly well suited in this respect for clean room conditions, as are usually required for laser applications. However, with gas pressure springs, there is often the problem that the piston rod is usually sealed via an oil filling and a seal. The oil causes the piston rod to always be wetted with oil. For this reason, such gas pressure springs are not actually suitable for clean rooms. However, if compatible lubrication systems are used or appropriate covers for the exposed piston rods are used, the use of gas pressure springs is generally conceivable.

It goes without saying that the abovementioned features and the features yet to be explained below are usable not only in the respectively specified combination, but also in other combinations or on their own, without departing from the scope of the present disclosure.

Exemplary embodiments of the present disclosure are illustrated in the drawings and are explained in more detail below.

FIG. 1A shows a simplified schematic illustration of a mounting of a large-scale optical unit denoted by reference sign 50. In the illustration shown, the (elongate) large-scale optical unit 50 is mounted in the Bessel points BP1 and BP2 (belonging to its elongate side) via rigid support surfaces 14a and 14b. The compressive stress profile D and bending stress profile B over the length L of the large-scale optical unit due to the mounting are also shown schematically. From the stress profiles D and B it can be seen that the weight force of the large-scale optical unit 50 in the region of the Bessel points BP1 and BP2 leads to compressive and bending stresses. It can also be seen that the bending stress D changes between compressive and tensile stress over the length of the large-scale optical unit. While the compressive stress at the support surfaces 14a and 14b is maximal, the tensile stress at the center of the long side of the large-scale optical unit is maximal.

Figure 1B:
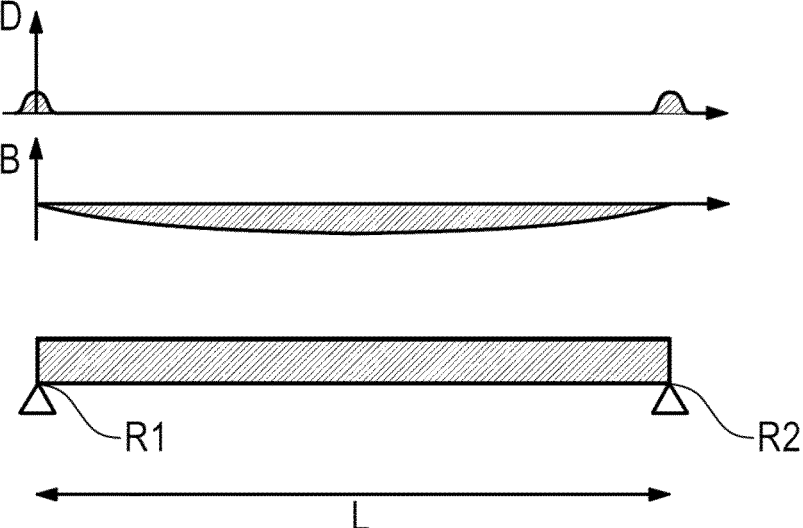
FIG. 1B shows a simplified schematic illustration of a mounting of a large-scale optical unit in edge points and the associated compressive stress profile and bending stress profile.

FIG. 1B shows a simplified schematic illustration of a mounting of a large-scale optical unit 50 in the edge points R1 and R2 and the associated compressive stress profile D and bending stress profile B over the length of the large-scale optical unit 50. From FIG. 2 it can be seen that the weight force of the large-scale optical unit 50 leads to a compressive stress in the region of the rigid support surfaces 14a and 14b, i.e. in the region of the edge points R1 and R2. In fact, the higher the weight force of the large-scale optical unit is and the smaller the support surfaces 14a and 14 are, the higher the stresses. This also applies to the mounting shown in FIG. 1A.

For economic reasons, the length of the large-scale optical unit 50 is partially selected such that it is smaller than or equal to the line length of a laser beam to be generated on a working plane. This means that the stresses generated by the mountings shown in FIGS. 1A and 1B in the respective large-scale optical units reside within the optically used region. Even if the optical units are selected to be somewhat larger than the typical line lengths, for example, if the line length is 1500 mm and the optical length is 1800 mm, the stresses generated often reside within the optically used region. Thus, the stress profiles of FIGS. 1A and 1B convincingly indicate the need for improved mounting.

Figure 2:
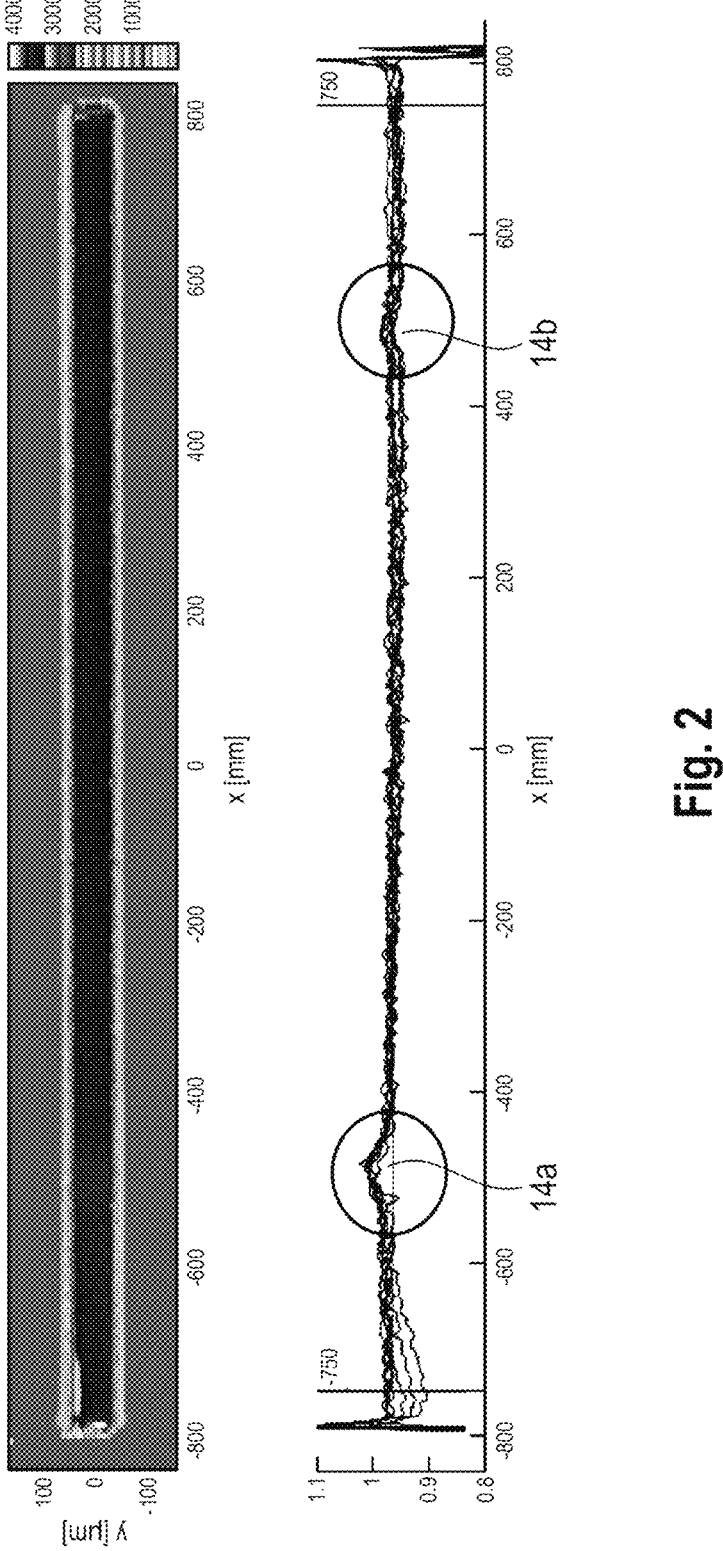
FIG. 2 shows a diagram of a line profile of a large-scale optical unit.

The effects of the stresses induced by mounting in the Bessel points within a large-scale optical unit are shown in FIG. 2. FIG. 2 shows in the upper figure an illustration of an intensity profile of a laser line running through a large-scale optical unit in the focus. The profile is recorded along the long side of the large-scale optical unit (x-direction). The bottom figure comprises a plurality of longitudinal sections, placed one above the other, through the intensity profile shown or sections along different y-positions, with the y-direction representing the direction of propagation of the laser line. If the camera is not fully polarization-insensitive (as in this case), the regions in the intensity profile assigned to regions in the large-scale optical unit in which the polarization is rotated due to stresses (induced by rigid mounting) will show intensity changes. Without knowledge of this effect, however, when considering the intensity profile, one would assume that the line profile has a higher intensity in these regions, i.e. in the support points 14a and 14b, although this is actually not the case or is only induced by the polarization rotation.

Figure 3:
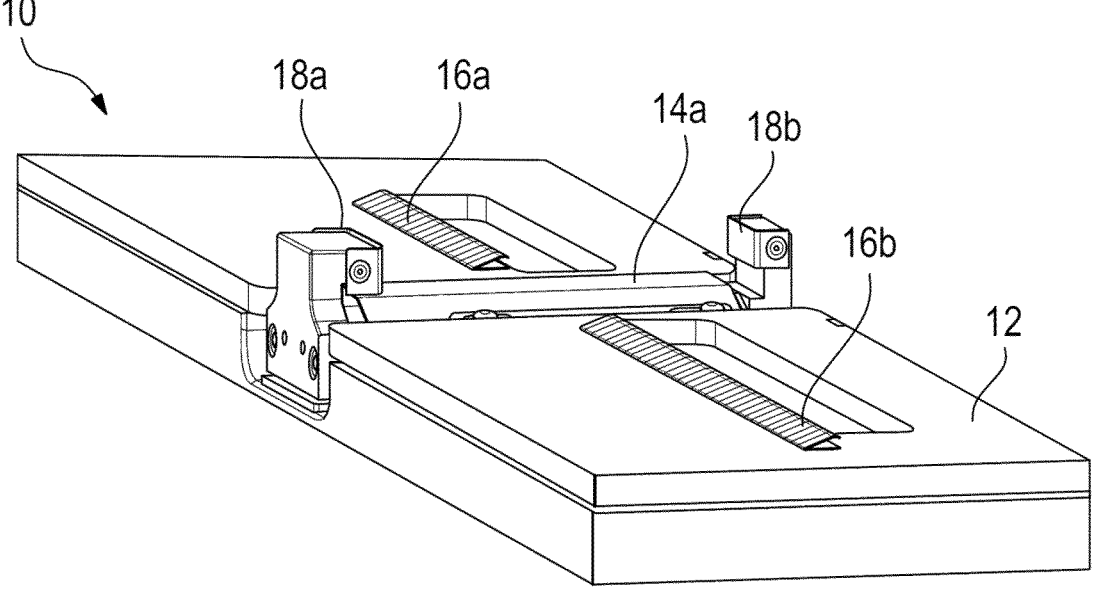
FIG. 3 shows a perspective view of a first exemplary embodiment of a new device configured according to aspects of the present disclosure.

In FIG. 3, a first exemplary embodiment of the new device in its entirety is denoted by reference sign 10. The device 10 is shown in a perspective view and comprises a flat carrier plate 12 and a rigid support surface 14a arranged on the carrier plate 12. The rigid support surface 14a is formed as a rigid, flat body. In the region of the rigid support surface 14a, rigid contact surfaces 18a and 18b are arranged on the carrier plate, which, like the rigid support surface 14a, are designed to hold a large-scale optical unit in a predefined position (and orientation). The rigid contact surfaces can in principle be adjustable and/or have a screw with spring preload, which is configured to press against the large-scale optical unit. Further arranged on the carrier plate 12 are two elastic support surfaces 16a and 16b in the form of simple spring strips. The spring strips have a predefined elasticity or preload and are designed for mounting the large-scale optical unit elastically. In particular, the spring strips as supportive elements for the rigid support surface 14a are intended to counteract (from below) the weight force of a large-scale optical unit 50 introduced.

Figure 4:
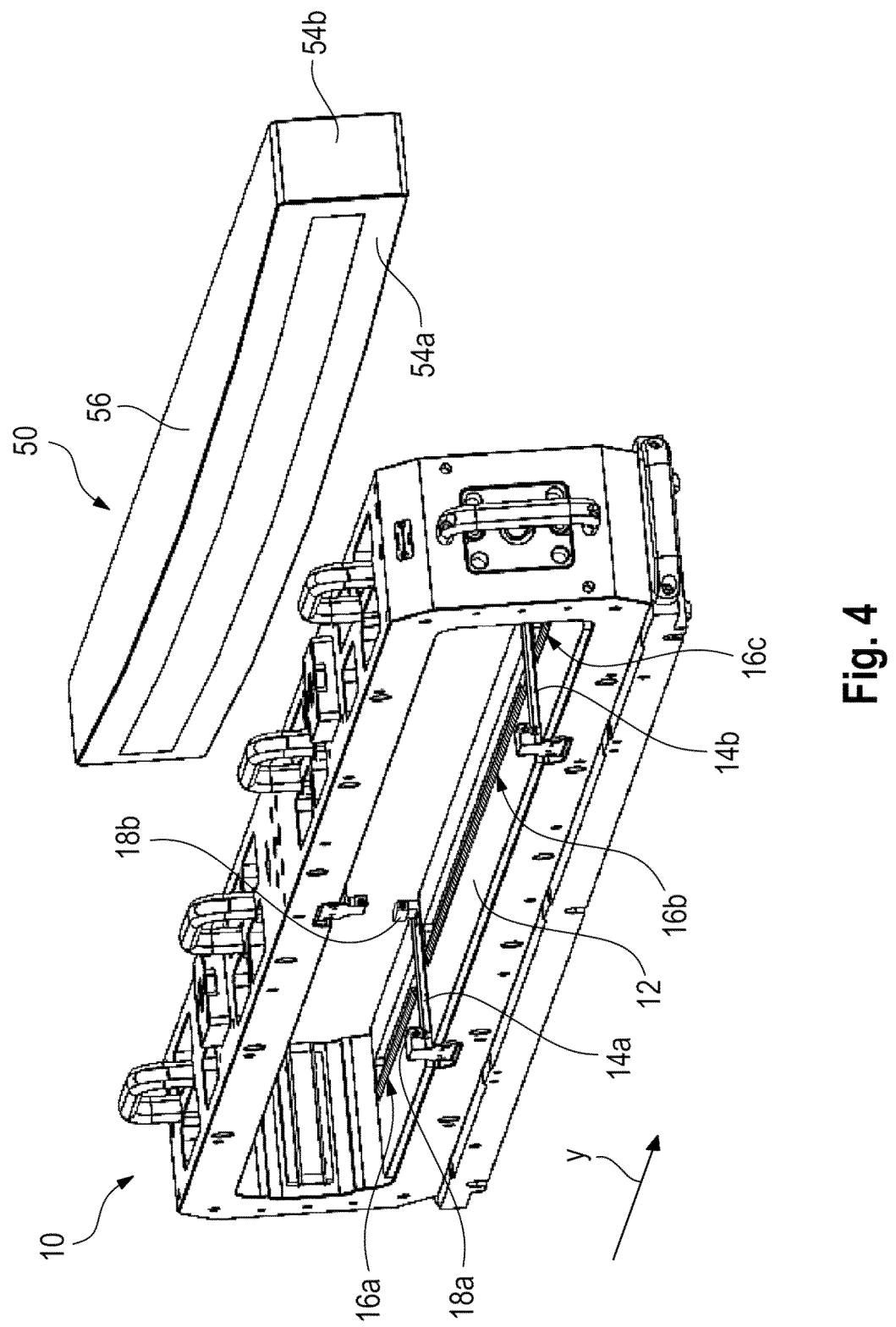
FIG. 4 shows a perspective view of a second exemplary embodiment of a new device configured according to aspects of the present disclosure.

FIG. 4 shows a perspective view of a second exemplary embodiment of the new device 10. FIG. 4 shows in particular the carrier plate 12 belonging to the device 10, two rigid support surfaces 14a and 14b arranged on the carrier plate, and three elastic support surfaces 16a, 16b and 16c. The carrier plate is part of a socket as is common for laser applications with large-scale optical units.

The elastic support surfaces 16a, 16b and 16c each comprise a metallic spring strip. The spring strips are arranged in such a way that they run in a row parallel to the longitudinal direction y of the carrier plate 12. Thus, the elastic support surfaces can support the large-scale optical unit 50 in the installed state over the entire length of the large-scale optical unit.

Furthermore, FIG. 4 shows a large-scale optical unit 50, which is suitable to be mounted in the socket on the carrier plate 12 by the rigid support surfaces 14a and 14b and by the elastic support surfaces 16a, 16b and 16c. In this exemplary embodiment, the large-scale optical unit 50 consists of a large, planoconvex converging lens with a bottom surface 52, four side surfaces 54a, 54b, 54c and 54d and a top surface 56.

Figure 5:
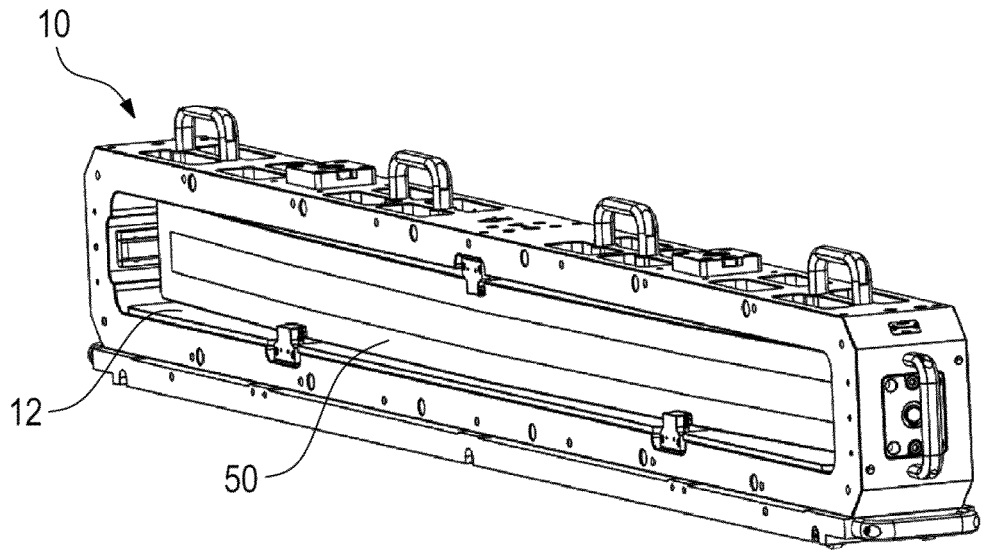
FIG. 5 shows a perspective view of the second exemplary embodiment of the new device with a built-in large-scale optical unit.

FIG. 5 shows a perspective view of the second exemplary embodiment of the new device 100 with a built-in large-scale optical unit 50. Large parts of the carrier plate 12 as well as the rigid support surfaces 14a and 14b and the elastic support surfaces 16a, 16b and 16c are covered by the large-scale optical unit 50 in this view.

Figure 6:
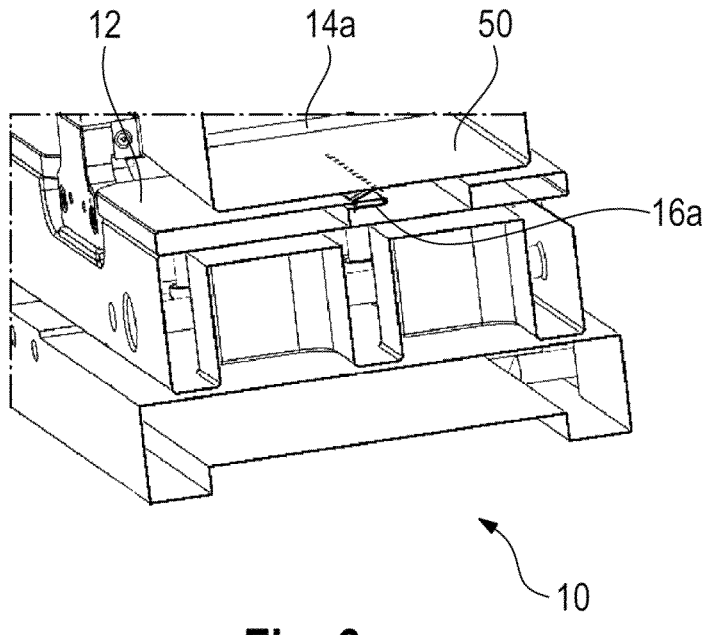
FIG. 6 shows a cross-sectional view of the second exemplary embodiment of the new device with a built-in large-scale optical unit.
Figure 7A:
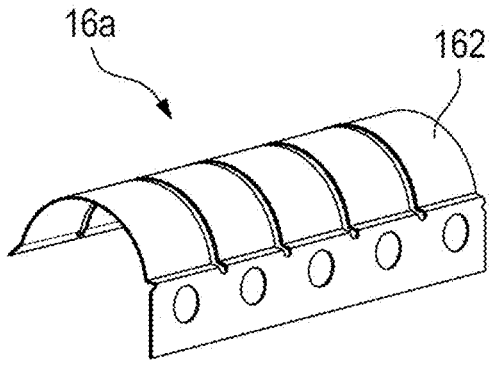
FIG. 7A, FIG. 7B, FIG. 7C and FIG. 7D show various exemplary embodiments of spring strips configured according to aspects of the present disclosure.
Figure 7B:
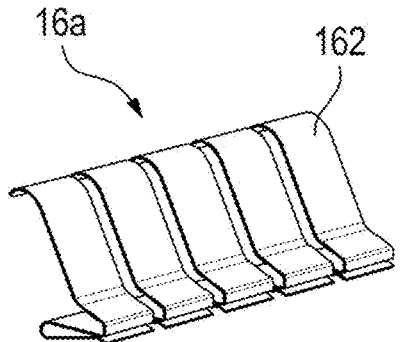
Figure 7C:
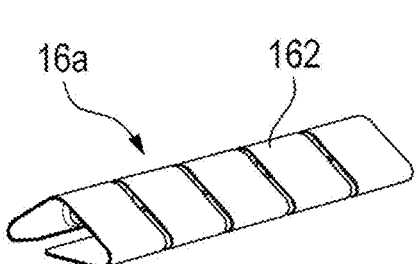
Figure 7D:
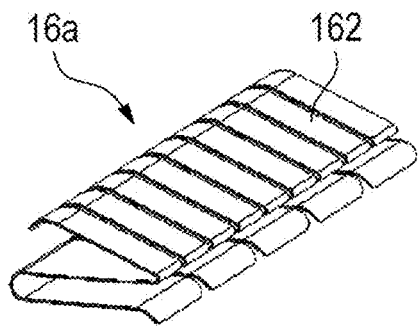

FIG. 6 shows a cross-sectional view of the second exemplary embodiment of the new device 10 with a built-in large-scale optical unit 50. Due to the transparency of the large-scale optical unit 50, it can be seen how the large-scale optical unit 50 rests on the rigid support surface 14*a* and on the elastic support surface 16*a*.

FIGS. 7A to 7D show various exemplary embodiments of spring strips as examples of elastic support surfaces 16*a*. Each of the spring strips shown consists of a series of individual elastic springs 162 in a line, wherein the springs 162 are connected to one another at least in one place. The spring strips shown in each of the exemplary embodiments shown consist of a thin, bent sheet metal. The spring strips or individual springs 162 are formed in such a way that they have a curvature. When assembling the spring strips or springs 162 on a carrier plate 12 of the new device 10, the spring strips or springs 162 are arranged in such a way that the curvature points away from the carrier plate 12. Thus, when installing a large-scale optical unit 50 on the carrier plate, the curvature points to the bottom surface 52 of the large-scale optical unit and can thus support the large-scale optical unit (over an area).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for mounting a large-scale optical unit, the device comprising:
   a carrier plate;
   a rigid support surface, which is arranged on the carrier plate and is designed for mounting a bottom surface of the large-scale optical unit in a predetermined position and a predetermined orientation; and
   an elastic support surface, which is arranged on the carrier plate and is designed for mounting the bottom surface of the large-scale optical unit elastically,
   wherein the rigid support surface is designed for mounting the large-scale optical unit at a Bessel point of the large-scale optical unit.

2. The device as claimed in claim 1, wherein a metal film or a plastics film is arranged on the rigid support surface.

3. The device as claimed in claim 1, wherein the device is configures such that more than 50 percent of the weight force of the large-scale optical unit acts on the elastic support surface.

4. The device as claimed in claim 1, wherein the elastic support surface comprises a spring strip with a plurality of elastic springs.

5. The device as claimed in claim 4, wherein a gradient of a spring characteristic curve of the elastic springs of the spring strip is between 0.1 N/mm and 10 N/mm.

6. The device as claimed in claim 4, wherein a material of the spring strip comprises metal or plastic.

7. The device as claimed in claim 1, wherein the elastic support surface comprises a plurality of threaded screws.

8. The device as claimed in claim 1, wherein the elastic support surface comprises a plastic bearing.

9. The device as claimed in claim 1, wherein the elastic support surface comprises at least one of a hydrostatic, a hydrodynamic bearing, an aerostatic, or an aerodynamic bearing.

10. The device as claimed in claim 7, wherein the threaded screws comprise an elastic spring.

* * * * *